United States Patent
Foss et al.

(10) Patent No.: US 6,295,557 B1
(45) Date of Patent: Sep. 25, 2001

(54) APPARATUS FOR SIMULATING INTERNET TRAFFIC

(75) Inventors: Andrew L. Foss, San Jose, CA (US); Richard A. Howes, Roswell, GA (US); William M. Leblanc; Edward C. Kersey, both of Athens, GA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/107,256

(22) Filed: Jun. 30, 1998

(51) Int. Cl.[7] .......................... G06F 15/177; G06F 13/38
(52) U.S. Cl. .......................... 709/224; 709/226; 709/250; 714/1
(58) Field of Search .................................. 395/187, 701; 370/257; 709/226, 244, 224, 250; 714/49, 1

(56) References Cited

U.S. PATENT DOCUMENTS

| | | | |
|---|---|---|---|
| 5,826,014 | * 10/1998 | Coley et al. ......................... | 395/187 |
| 5,896,498 | * 4/1999 | Dent et al. .......................... | 395/187 |
| 5,907,704 | * 5/1999 | Gudmundson et al. ............. | 395/701 |
| 6,006,264 | * 12/1999 | Colby et al. ......................... | 709/226 |
| 6,014,698 | * 1/2000 | Griffiths .............................. | 709/224 |
| 6,028,848 | * 2/2000 | Bhatia et al. ....................... | 370/257 |
| 6,029,203 | * 2/2000 | Bhatia et al. ....................... | 709/244 |
| 6,052,803 | * 4/2000 | Bhatia et al. ........................ | 714/49 |
| 6,134,588 | * 10/2000 | Guenthner et al. ................. | 709/226 |

\* cited by examiner

*Primary Examiner*—Mark H. Rinehart
*Assistant Examiner*—Paul Kang
(74) *Attorney, Agent, or Firm*—Van Pelt & Yi

(57) ABSTRACT

A system and method are disclosed for simulating a plurality of TCP connections directed toward an Internet site under test. The method includes activating a producer thread process. The producer thread process includes randomly determining an IP address and requesting a TCP layer process to make a TCP connection to the randomly determined IP address. The producer thread process does not block or wait for the TCP connection to be established. A consumer thread process is activated upon the occurrence of an event on the TCP connection. The consumer thread process includes retrieving information from the TCP connection and recording statistics related to the information.

20 Claims, 9 Drawing Sheets

APPARATUS FOR SIMULATING INTERNET TRAFFIC

CROSS REFERENCE TO RELATED APPLICATIONS

BACKGROUND OF THE INVENTION

1. Field of the Invention

This invention relates generally to testing the ability of a site which is accessible over the Internet to handle multiple TCP connections from a number of different sources. Specifically, the invention relates to a system and method for simulating a large quantity of Internet traffic in an efficient manner and recording information about how a site that is under test handles the simulated traffic.

2. Description of the Related Art

The increased popularity of the Internet means that a popular site on the Internet may receive a large quantity of traffic from a vast number of IP address over the Internet. It has become increasingly important to determine the ability of a site to handle such a large volume of traffic so that the ability of whatever load balancing and traffic distribution scheme that may be used by a site to distribute connections among a group of servers (sometimes referred to as a "server farm") is operating in an efficient manner. Also, it is important to evaluate the ability of an individual web server that is servicing a site to handle connections when the volume of traffic is high.

In order to adequately test the ability of an Internet site to handle a large number of connections, it is necessary to generate a large number of TCP connections to the site from difference IP addresses. Under real conditions, it is possible that a site may receive a large number of connections almost simultaneously from a number of different sites on the Internet that wish to connect to the site being evaluated. Handling the burstiness of such traffic is essential, since a large volume or burst of traffic that occurs during a very short period of time is often the cause of degraded performance and the inability of a server or a group of servers to adequately service customers.

One way to adequately test a site would be to use a large number of connection sources which could generate a large volume of Internet traffic from a number of different IP addresses in a short period of time. Such a system would be able to produce a large number of packets in parallel which would simulate real conditions when a number of users attempt to connect to a site. However, it may be impractical to use a large number of connection sources to test a site. Furthermore, coordinating the collection of data evaluating the site under test performance under the large burst of connections would be difficult since data would be obtained at a number of different sites.

It would be useful if an efficient method of creating a large number of TCP connections from a single TCP connection simulator could be developed that could both simulate a large number of connections from a large number of different IP addresses and could also simulate the large number of connections in a very short period of time so that the ability of the site under test to handle bursts of traffic could be evaluated.

Typically, when an application layer writes data to or reads data from a TCP layer, the application layer requests a TCP channel and then waits while data is read from or written to the channel. For example, in a UNIX implementation of TCP, a thread may either write data to a TCP channel or attempt to read data from a TCP channel. It should be understood that when the term thread is used, referring to a UNIX implementation, that other non-UNIX embodiments would use whatever appropriate type of process is available under whatever operating system is being used. For purposes of this description, the terms thread and process will be used interchangeably.

While TCP is handling the data, the thread is generally blocked, waiting for the data. Such an application would not be able to generate a large burst of traffic as described above without requiring a large number of threads to be simultaneously executing data read and data write operations to a TCP channel. The ability of such a device to generate the required volume of traffic in a short period of time would be limited by the ability of the device to handle a large number of threads in parallel to create a large number of connections. This limitation prevents the amount of bursty traffic that is desired from being generated by a single machine. Therefore, what is needed is a more efficient way to generate a large number of TCP connections from a large number of IP addresses using as few threads or active parallel processes as possible. Ideally, many connections could be generated in parallel without requiring the generation of an unwieldy number of threads.

SUMMARY OF THE INVENTION

Accordingly, the present invention provides a system and method for quickly generating a large number of TCP connections to a site under test. A producer thread generates a large number of TCP connections and places data in the TCP resend buffer without blocking, waiting for data to be sent, or checking for a response from the TCP channel. A limited number of consumer threads are defined which are activated upon the occurrence o f an event on any TCP channel. TCP passes to each newly activated consumer thread a pointer to a data structure which provides information to the thread about the IP address and port that are being simulated across the TCP channel on which the event occurred. Thus, a single producer thread generates a large number of TCP connections and a small number of consumer threads are able to handle events that occur on the connections. The consumer threads also collect data regarding the ability of the site under test to handle the volume of traffic generated. A second producer thread may be used to replace connections generated in a burst by the first producer thread when those connections are closed either by a consumer thread or by the site under test.

In one embodiment, a system and method are disclosed for simulating a plurality of TCP connections directed toward an Internet site under test. The method includes activating a producer thread process. The producer thread process includes randomly determining an IP address and requesting a TCP layer process to make a TCP connection to the randomly determined IP address. The producer thread process does not block or wait for the TCP connection to be established. A consumer thread process is activated upon the occurrence of an event on the TCP connection. The consumer thread process includes retrieving information from the TCP connection and recording statistics related to the information.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE PREFERRED EMBODIMENTS

Reference will now be made in detail to the preferred embodiment of the invention. An example of the preferred embodiment is illustrated in the accompanying drawings. While the invention will be described in conjunction with that preferred embodiment, it will be understood that it is not intended to limit the invention to one preferred embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The basic problem of networking a set of devices has been divided into layers. The bottom layer is a physical layer. It handles the actual physical connections between devices. The second layer is the data link layer. It describes how the data is formatted which is on the physical medium which connects the devices. The third layer is the network layer. It handles cases where there is greater than one connection per machine. The fourth layer is the transport layer. This determines that all of the it messages from a source reach the destination reliably and in an unduplicated fashion. The second layer is subdivided into a Logical Link Control ("LLC") layer and a Media Access Control ("MAC") layer. A MAC address is required in this layer. In the TCP/IP suite of protocols employed on the Internet, the third layer or network layer is the IP layer. This layer requires a globally unique IP address in order to route packets to the right physical machine. The IP address is issued by a central authority known as the Internet Assigned Number Authority ("IANA"). Also, in TCP/IP, the fourth layer or transport layer is the TCP layer. The TCP layer additionally requires a machine port number so that the packet is sent to the connect port of a specific machine. The TCP layer may interact directly with an application layer or with one or more intervening layers. The present invention is implemented in one embodiment by interacting with TCP using an application layer program.

Figure 1:
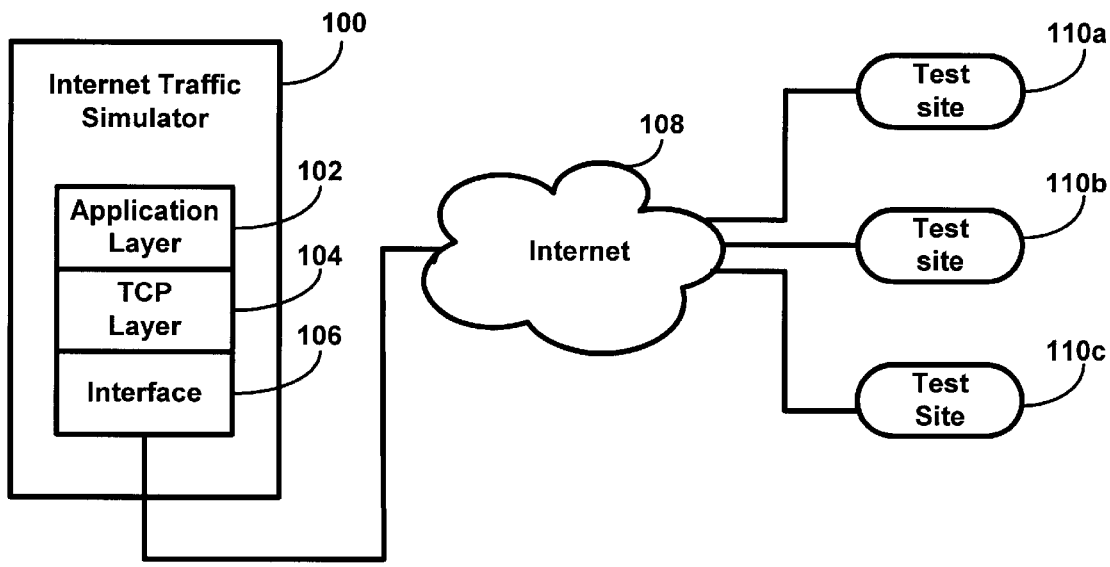
FIG. 1 is a block diagram illustrating a system for generating traffic for the purpose of testing multiple sites over the Internet.

FIG. 1 is a block diagram illustrating a system for generating traffic for the purpose of testing multiple sites over the Internet. An Internet traffic simulator 100 includes an application layer 102, a TCP layer 104 and an interface 106. Interface 106 is connected to the Internet 108 in one embodiment. In other embodiments, interface 106 is connected to some other network interface which enables the interface to communicate with the sites being tested. In many cases, it is convenient to have interface 106 connect to the various test sites via the Internet. In such cases, the source IP address of the generated network should be part of a subnet that is owned by the party doing the testing so that the reply messages from the device under test may be monitored by the party. Three test sites, 110A, 110B and 110C, are shown. In some embodiments, only a single site is tested at a time, but it also possible that a number of sites may be tested simultaneously by simulating traffic from Internet traffic simulator 100.

The Internet traffic simulator is able to quickly simulate a large volume of traffic from a large number of IP addresses because of its special system architecture that initiate a large number of connections using a single producer process or thread and also includes a limited number of consumer threads which handle the connections when an event occurs. It should be noted that in this description the word thread and process are used interchangeably. It should be understood that in this specification when either thread or process is used, the other term may be substituted within the spirit and scope of the invention.

Figure 2:
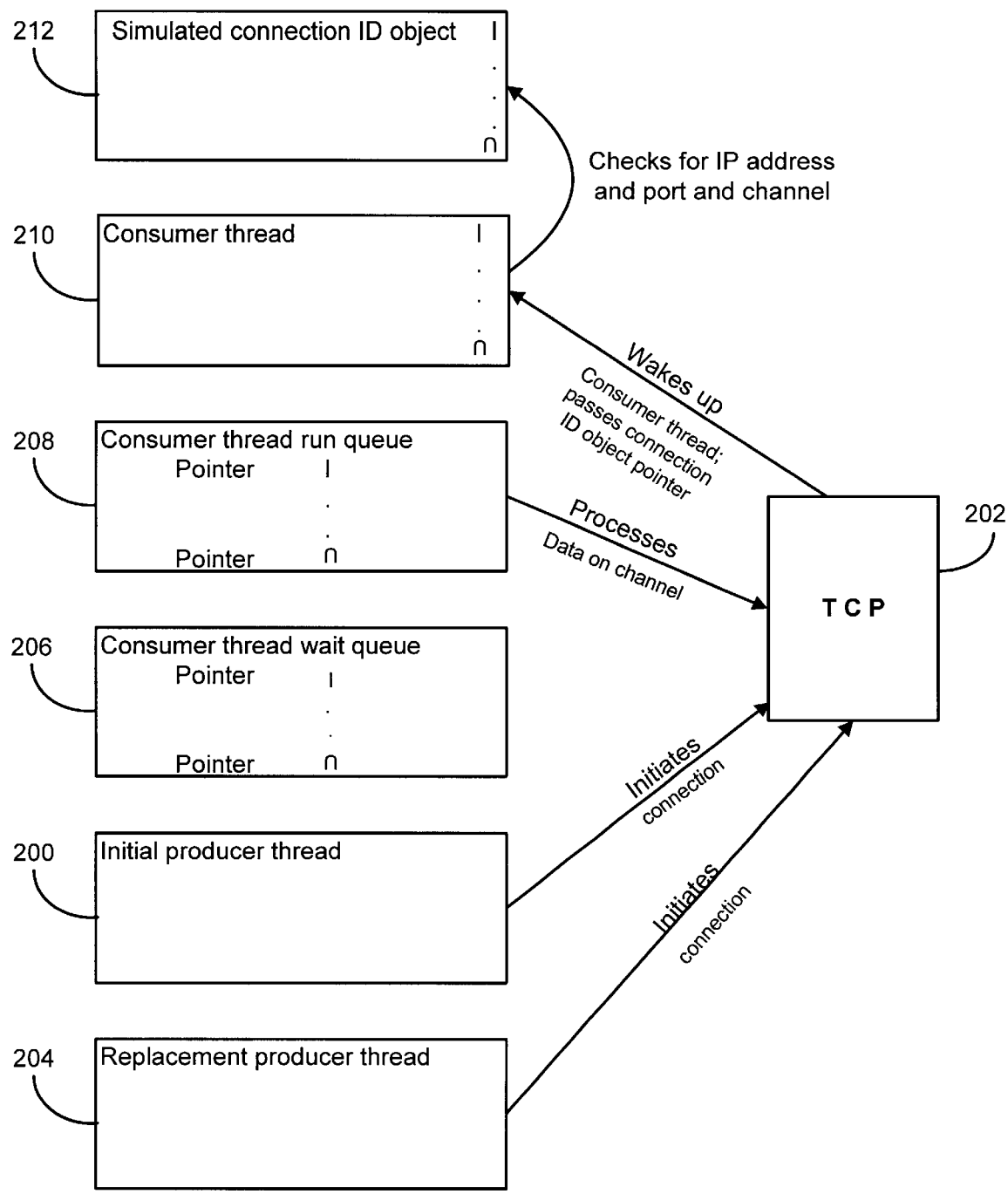
FIG. 2 is a block diagram illustrating the various producer and consumer threads which are implemented in the application layer of the Internet traffic simulator.

FIG. 2 is a block diagram illustrating the various producer and consumer threads which are implemented in the application layer of the Internet traffic simulator. An initial producer thread 200 initiates a multiple number of connections using a TCP layer 202. The initial producer thread is not blocked and does not wait for each connection that it requests to be established nor does it wait for any data to be transferred on that connection. Instead, the initial producer thread moves on immediately to create the next connection that is to be created and leaves the further handling of communication on the channel created by the connection to a consumer thread. Consumer threads are activated by TCP layer 202 whenever a communication event occurs that requires some action by the application layer.

In one embodiment, a replacement producer thread 204 is also included to replace connections that were generated by initial producer thread 200 and were later closed by either by the Internet traffic simulator or by the destination test site to which the Internet traffic simulator the traffic is directing traffic. In such embodiments, the replacement producer thread initiates connections using a process that is similar to the process that the initial producer thread uses to initiate connections. A consumer thread wait queue 206 includes a number of pointers of consumer threads and a consumer thread run queue 208 contains a number of pointers to consumer threads that are currently active. A set of consumer threads 210 is also included.

When a communication event occurs, TCP wakes up one of the consumer threads and passes a pointer to a simulated connection ID object which is a member of set of simulated connection ID objects 212. The consumer thread that is woke up by TCP checks the simulated connection ID object corresponding to the pointer passed to the consumer thread from TCP. From the simulated connection ID object, the consumer thread determines the IP address and the port number that are being simulated. The consumer thread also learns from the simulated connection ID object the channel that contains data from TCP or the channel that contains a message from TCP.

Figure 3:
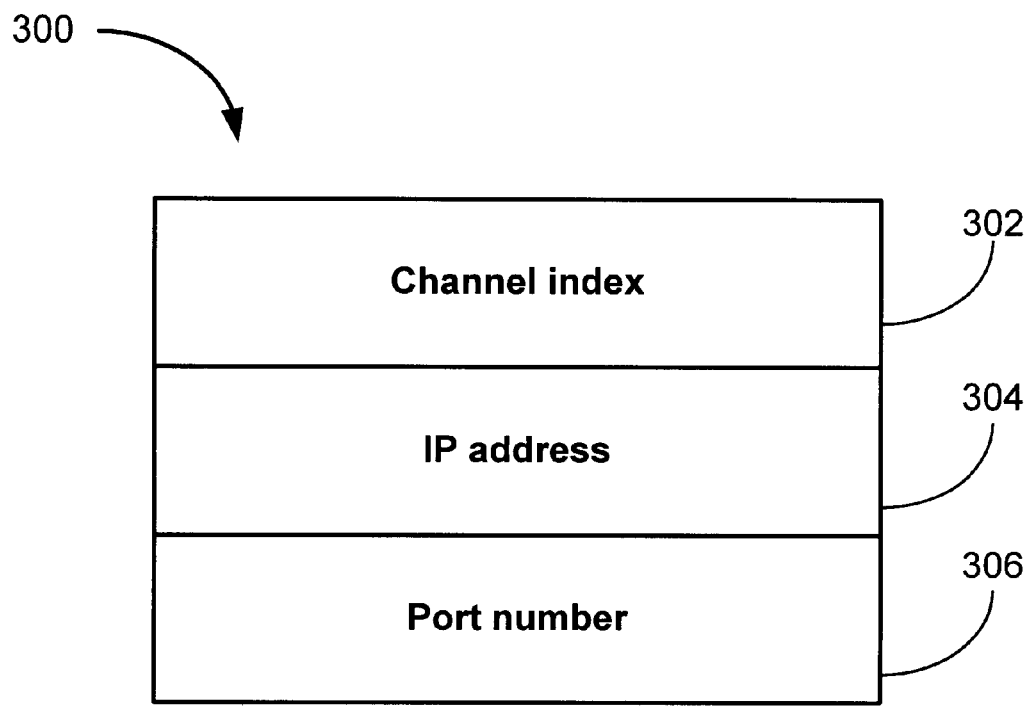
FIG. 3 is a block diagram illustrating the data structure of a simulated connection ID object.

Thus, the producer thread initiates a simulated connection from a simulated site but does not process data or messages received on the channel corresponding to the connection. When an event occurs on the channel corresponding to the connection, TCP wakes up a consumer thread and passes to the consumer thread a pointer that points to a simulated connection ID object. The simulated connection ID object provides information to the consumer thread. The information includes the IP address and port number that are being simulated and the channel that may contain data or FIG. 3 is a block diagram illustrating the data structure of a simulated connection ID object. Simulated connection ID object 300 includes a channel index 302, an IP address 304 and the port number 306. In one embodiment, channel index 302 stores an index to a channel array. The channel array includes all of the channels that may be set up for a TCP connection. Thus, the channel index specifies a specific TCP channel for which a connection has been set up. In other embodiments, the channels are not stored in an anay but may be stored in some other data structure such as a linked list. In such embodiments, instead of a channel index, a channel pointer may be included in the simulated connection ID object. In one embodiment, it is prefer-red that the channels are stored in an array so that the channel indices may be stepped through in a convenient manner.

IP address 304 stores the IP address for the connection that is being simulated. Port number 306 stores the port number for the connection that is being simulated. The IP address and port number are originally generated by a producer process in a manner that is illustrated below in FIG. 4.

In the embodiment shown, the connection ID object includes only a source IP address and source port number to identify the connection. In another embodiment, the connection ID object also includes a destination IP address and destination port number. In such an embodiment, the consumer threads are used to manage a number of connections to different devices which are being tested. In such systems, when a consumer thread wakes up and reads the connection ID object, it must determine the IP address of the device being tested as well as the IP address and port number of the device being simulated.

Figure 4:
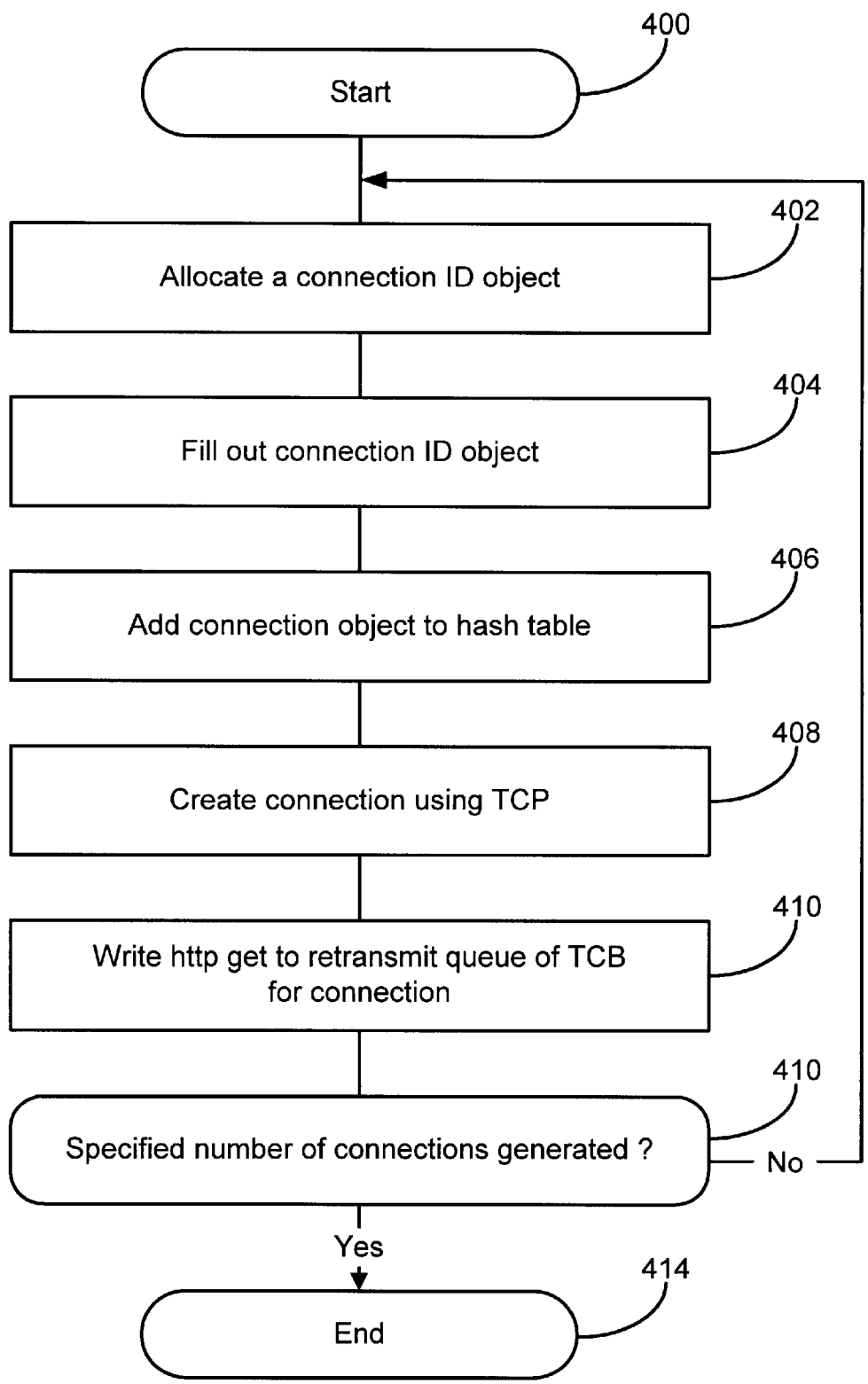
FIG. 4 is a flow chart illustrating a process executed by a producer thread for setting up a simulated connection from a simulated source.

FIG. 4 is a flow chart illustrating a process executed by a producer thread for setting up a simulated connection from a simulated source. The process starts at 400. In step 402, the simulated connection ID object is allocated for the new connection. Next, in step 404, the connection ID object is filled out by specifying a channel index, a source IP address, and a source port number. The process of filling out the connection ID object is further described in FIG. 5. Next, a connection to the device being tested is created using TCP. The process of creating the connection is further described in FIG. 6.

In step 406, the connection ID object is added to a hash table in one embodiment. The purpose of adding the connection ID object to a hash table is to provide a list of connection ID objects that may be accessed by using a pointer. This pointer is stored by TCP as part of a modified transmission control block (TCB). The pointer to the connection ID object is returned by TCP to a consumer thread when the consumer thread is activated as is described below.

As noted above, in other embodiments, other data structures for storing connection ID objects such as an array are used.

The producer thread directs the TCP layer to create a connection in a step 408. In a step 410, the producer thread writes an http get request to the output queue of the TCB for the connection. It should be noted that the producer thread does not write data to the TCB and then block or wait for TCP to send the data and respond on the channel. As a result, the producer thread is able to move on to create the next simulated connection without waiting for TCP to set up the first connection. Events occuring on the first connection are not processed by the producer thread and instead are processed by a consumer thread. In a step 412, the producer thread checks whether a specified number of connections have been generated. If all of the connections have not been generated then control is transferred back to step 402 and another simulated connection is created in the manner described above. If the specified number of connection shave been generated then the process ends at 414.

The producer thread described above is designed to continuously operate until a specified number of connections have been initiated. In addition, a special instance of the producer thread which initiates only one connection may be called by a consumer thread when an existing connection is closed. Thus, after all of the initial connections have been created, the steps of the producer thread may be executed to replace connections as they are closed.

Figure 5:
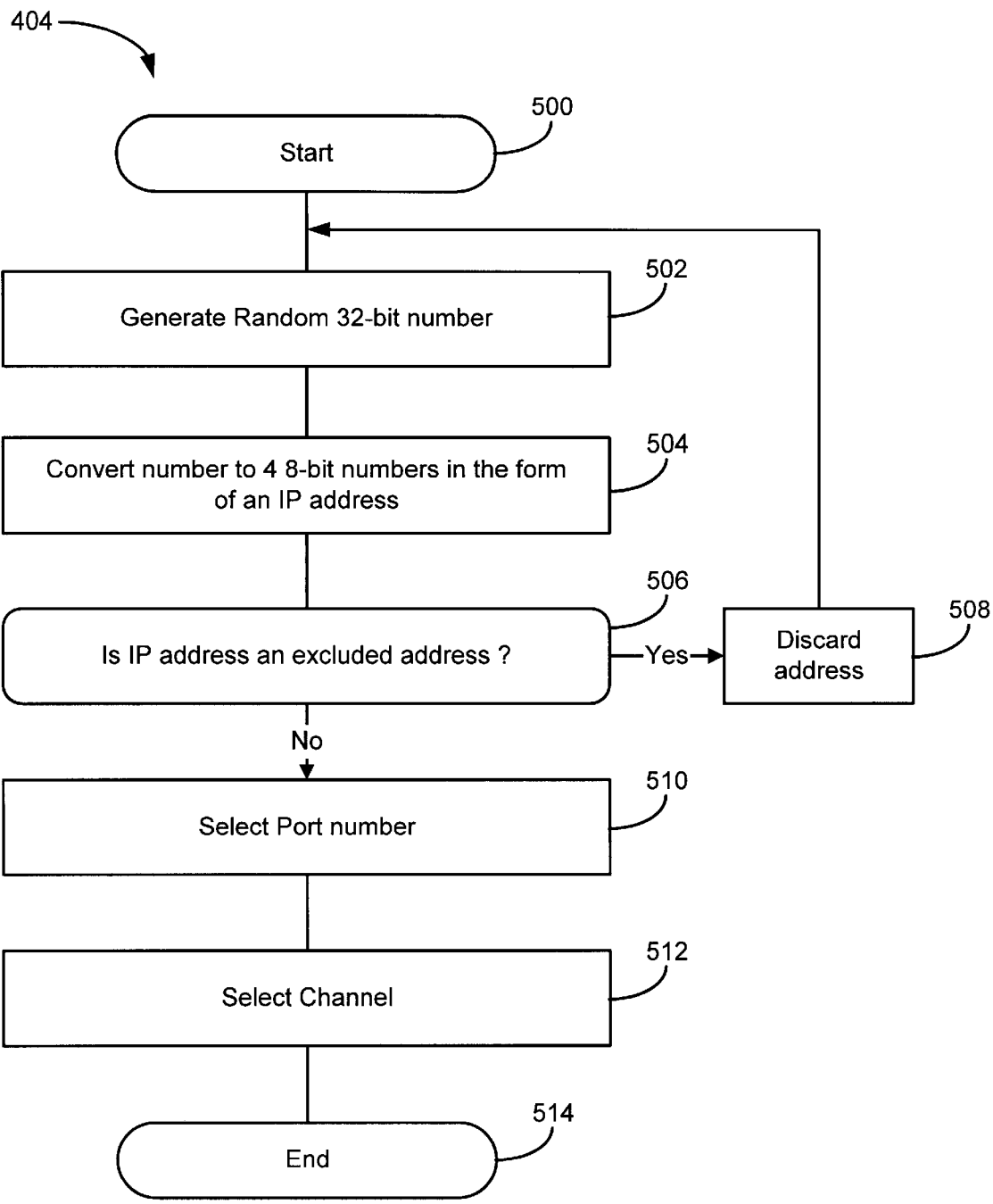
FIG. 5 is a flow chart illustrating in detail filling out a connection ID object.

FIG. 5 is a flow chart illustrating in detail step 404 of FIG. 4 for filling out a connection ID object. The process starts at 500. In a step 502, the producer thread generates a random 32 bit number. Next, in a step 504, the number is converted to four eight bit numbers in the form of an IP address. Next, in a step 506, the producer thread checks whether the IP address randomly generated is an excluded address. The purpose of checking whether the IP address is an excluded address is to enable the test to be set up so that the device or network under test is not tested by sending it a packet that appears to have been generated from inside its own network. Also, it may be desirable to exclude certain IP addresses so that two different testing devices will not have conflicting ranges. In addition, certain other addresses such as multicast addresses, broadcast addresses, and network addresses may be automatically excluded. Also, it should be noted that in addition to specifying an excluded range, the range of the IP addresses generated may also be restricted by specifying upper and lower bounds for the addresses.

A list of IP addresses may be specified prior to the test which will be excluded from the IP addresses included as the source address for simulated packets. Thus, the IP address of the router connected to a device under test and any other devices in the LAN of the device under test may be specified. If, by chance, one of those addresses is randomly chosen by the producer thread, then the address will be discarded and another address will be generated. In addition, in one embodiment, the user may specify a range of addresses to be included in the test or excluded from the test. Thus, simulated traffic can be created for any range of IP addresses and any IP addresses in the range may be excluded if desired.

If the IP address generated in step 504 is an excluded address, then control is transferred to step 508 and the address is discarded. Control is then transferred back to step 502. If the address generated in step 504 is not an excluded address, then control is transferred to a step 510 and a port number is selected. Nest, in a step 512, the channel for the connection is selected and the process ends at 514.

Figure 6:
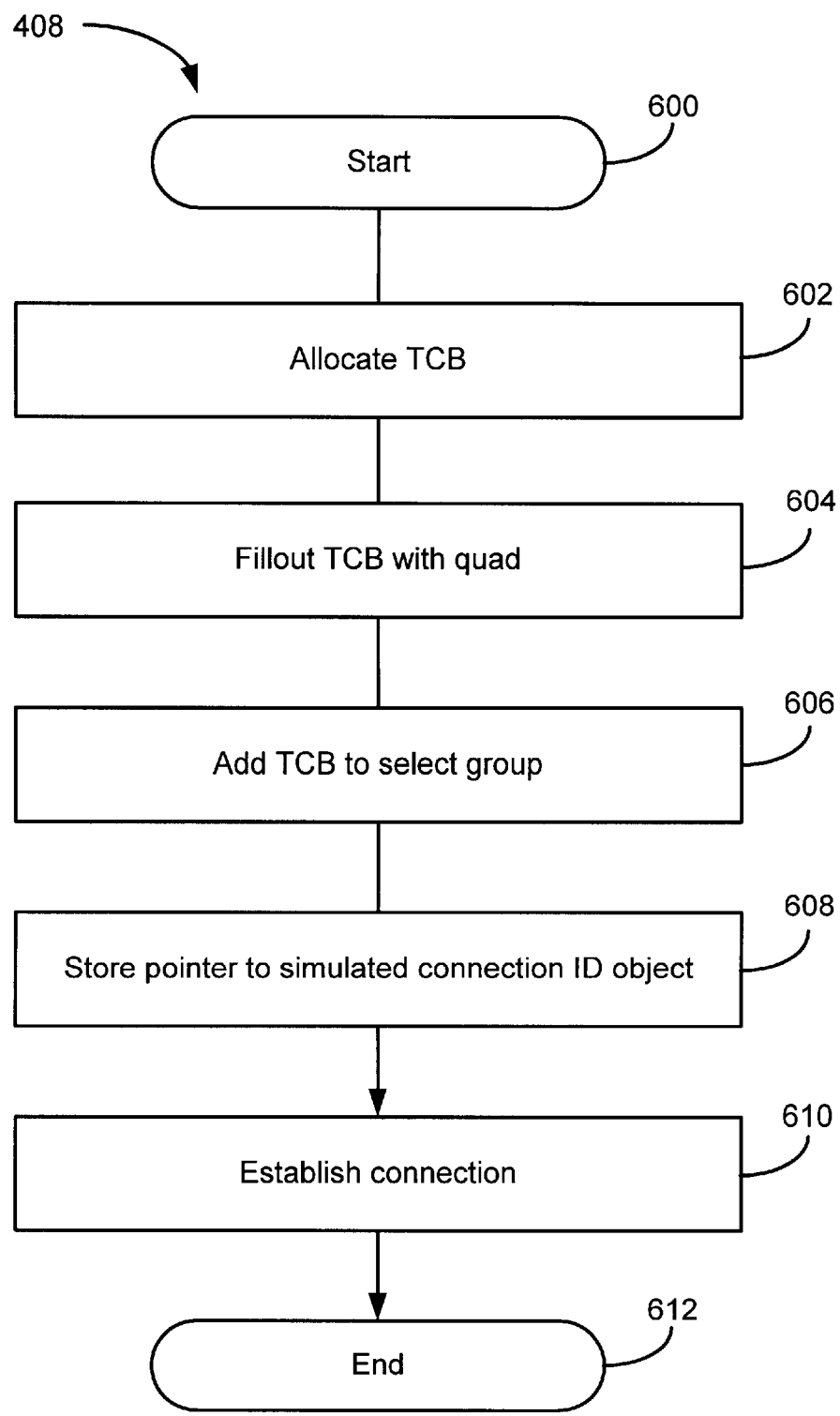
FIG. 6 is a flow chart illustrating in detail for creating a connection using TCP.

FIG. 6 is a flow chart illustrating in detail step 408 of FIG. 4 for creating a connection using TCP. The process starts at 600. In step 602, a TCB is allocated for the connection. In a step 604, the TCB is filled out with the quad for the connection. The quad includes the source IP address and port number and the destination IP address and port number. The source IP address and port number are determined by the process described in FIG. 5. Next, in a step 606, the TCB is added to a select group. In a step 608, a pointer to the simulated connection ID object is also stored with the TCB. In a step 610, the connection is established, and the process ends at 612.

It should be noted that there are two differences in the process described above and a standard process for setting up a connection using TCP. First, the concept of a select group is used and the TCB is added to the select group. The purpose of the select group is to mark the particular TCB as a TCB that belongs to a connection from a simulated source. When an event happens for the connection in the select group, TCP will wake up the next consumer process in the consumer process wait queue so that the levent can be processed. Second, TCP stores a pointer to a simulated connection ID object. The purpose of storing the pointer is to enable TCP to return the pointer to the consumer process that is awakened so that the consumer process can look at the correct channel and process the event on the channel for the correct simulated source.

Figure 7:
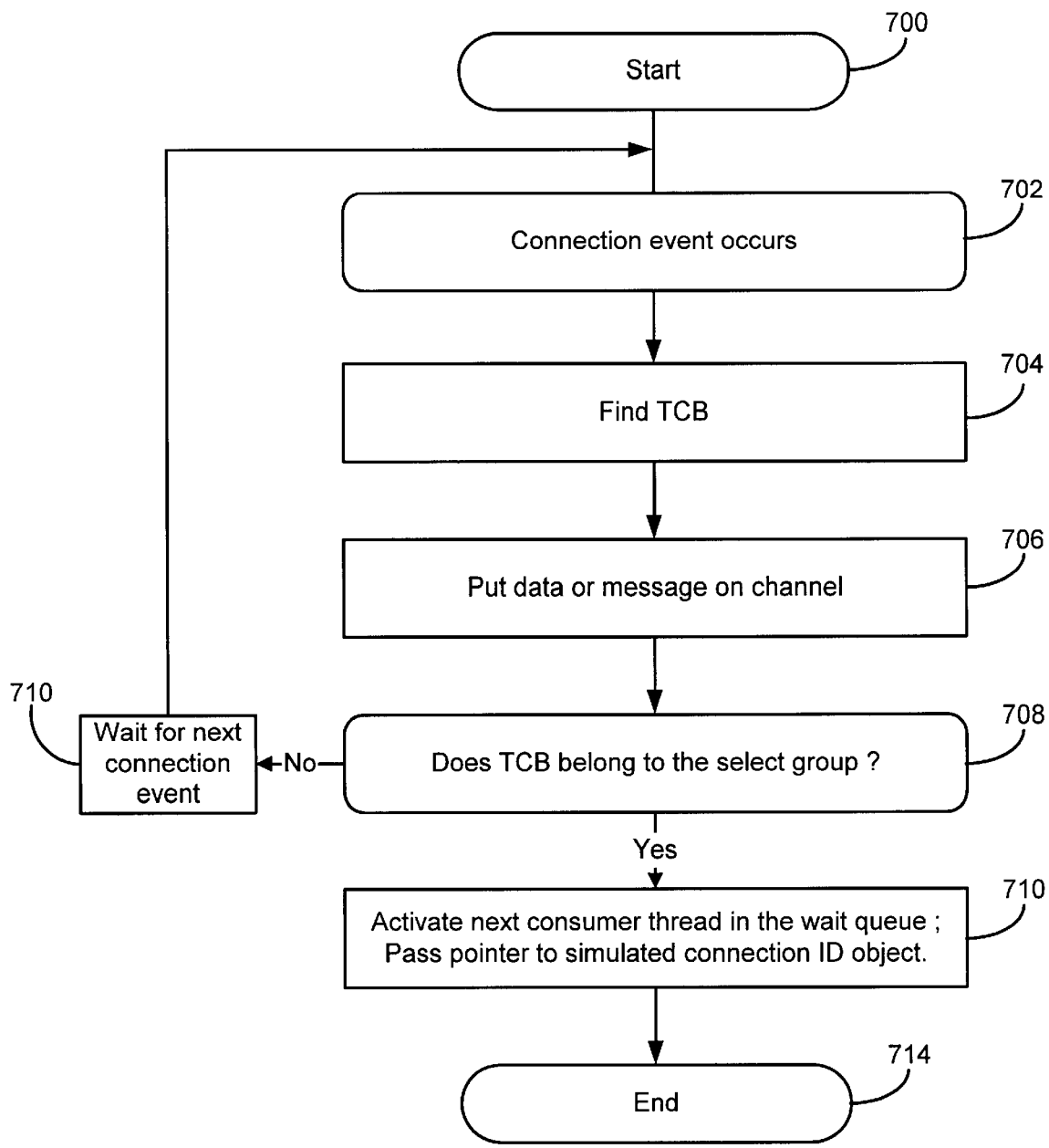
FIG. 7 is a flow chart illustrating the process implemented by TCP when a connection event occurs.

FIG. 7 is a flow chart illustrating the process implemented by TCP when a connection event occurs. The process starts at 700. A connection event occurs at 702. The connection event may be the receipt of data or may also be the connection closing or the occurrence of some error. In a step 704, TCP finds the TCB associated with the connection. This is done by searching for the TCB which matches the quad of the incoming packet which caused the event. In a step 706, TCP puts the data or message indicating the status of the connection on the channel. In a step 708, TCP checks whether the TCB belonging to the connection belongs to the select group. If the TCB does not belong to the select group, then control is transferred to a step 710 and TCP waits for the next connection event. If the TCB does belong to the select group, then control is transferred to a step 712 and TCP activates the next consumer thread in the consumer thread wait queue. TCP passes a pointer to the simulated connection ID object for the connection socket to the consumer thread. The process ends at 714.

Thus, the ordinary TCP process is modified in that TCP checks whether the TCB corresponding to the connection event belongs to the select group. If it does, then a special process is implemented for activating a consumer thread to check the channel and to process the information on the channel. A pointer to the simulated connection ID object is provided to the consumer thread so that the consumer thread can check the correct channel and evaluate the event for the correct simulated device.

Figure 8:
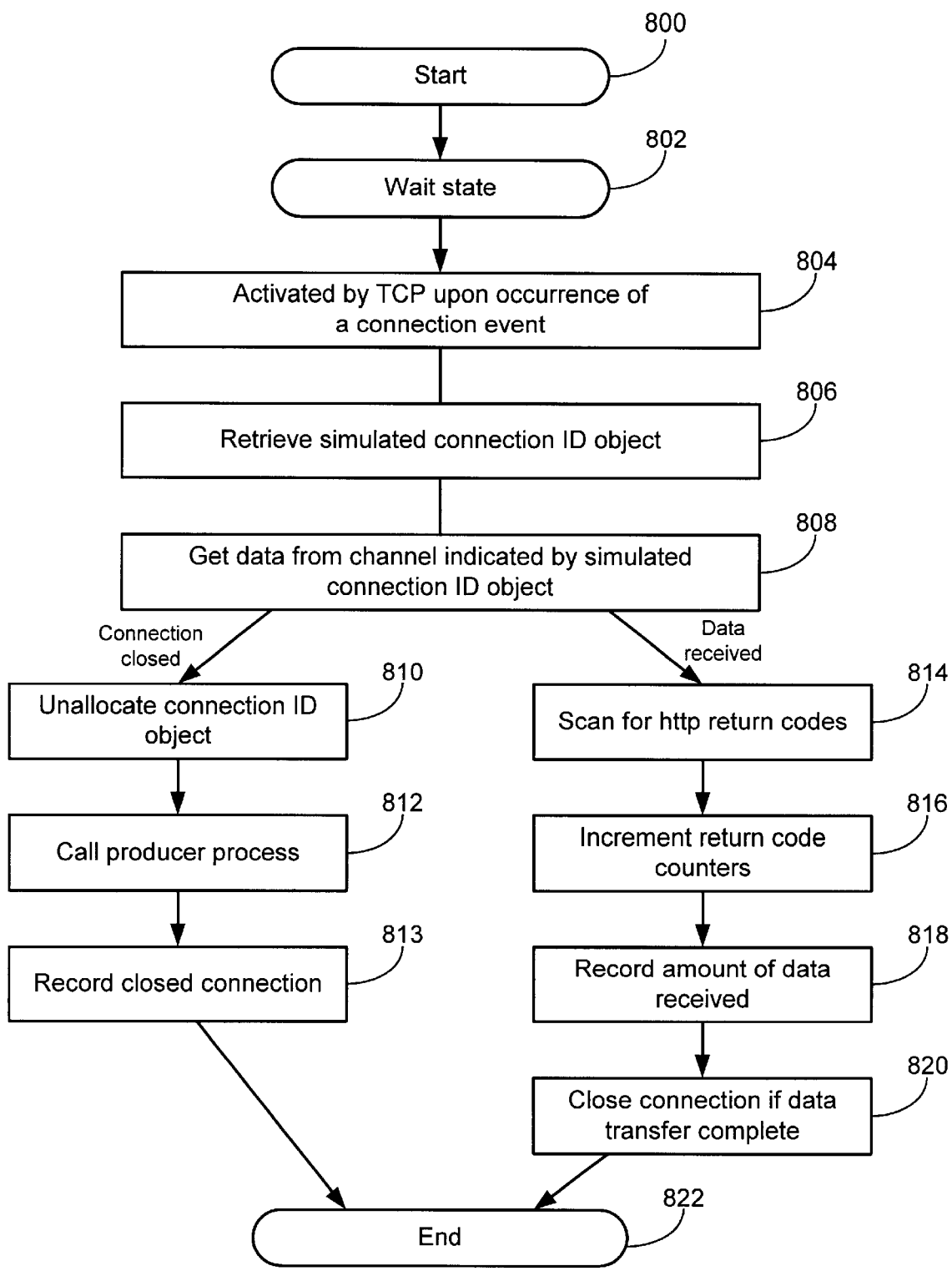
FIG. 8 is a flow chart illustrating a process implemented by a consumer thread.

FIG. 8 is a flow chart illustrating a process implemented by a consumer thread. The process starts at 800, and the consumer thread is in wait state 802. The consumer thread is activated by TCP in a step 804 upon the occurrence of a connection event. Next, in a step 806, the consumer thread retrieves the simulated connection ID object based on the pointer passed to it by TCP. The simulated connection ID object contains an index to a channel and the consumer process gets the data from the channel in a step 808. If the channel indicates that the connection has been closed for some reason, then control is transferred to a step 810. The consumer thread process unallocates the connection ID object and then, in a step 812, calls the producer process to create a new connection to replace the closed connection. Next, in a step 813, the consumer thread records the fact that the connection was closed. The process then ends at 822.

If after step 808 the channel indicates that data has been received, then control is transferred to a step 814. In step 814, the data is scanned for http return codes. Http return codes are special codes sent by a site in response to an http get. For example, http return code 104 indicates that a page has not been found. Other http return codes may indicate that the server is busy and is unable to respond. These codes may provide important information regarding the performance of the server or network of servers responding to the simulated http get request sent by the producer thread. The consumer thread recovers this information and in a step 816, increments the return code counters for whatever return codes have been detected. In one embodiment, the consumer thread does not keep track of individual codes, but keeps track of groups of codes such as 100 series codes, 200 series codes, etc. In different embodiments, the consumer thread keeps track of different statistics relating to the information on the connection.

If data is received, then, in a step 818, the consumer thread records the amount of data received. The amount of data received indicates the throughput of the site being tested. Next, in a step 820, the connection is closed by the consumer thread when data transfer is complete. The consumer thread process then ends at 822. It should be noted that the consumer thread does not block and wait for more data from TCP if data transfer is not complete. The consumer thread process ends and the consumer thread goes back to the wait queue as soon as it records the relevant characteristics of the connection event. When the rest of the data is received by TCP, TCP will wake up whatever consumer thread is next in the wait queue and give that consumer thread a pointer to the connection ID object. That thread then will process the connection event. Thus, threads do not block and a large number of threads are not required to manage a very large number of connections.

A method has been shown for simulating Internet traffic from a large number of IP addresses. The method includes using a producer thread for creating connections. When a connection event occurs, TCP activates a consumer thread and the consumer thread handles the event. In the embodiment described, the producer thread sends an http get when the new connection is established. The response of the server being tested is recorded by the consumer thread. It should be noted that in other embodiments, different messages are sent to devices being tested and their response to those messages is evaluated by a consumer thread. For example, other protocols such as telnet or FTP may also be simulated.

The present invention employs various process steps involving data manipulation. These steps require physical manipulation of physical quantities. Typically, these quantities take the form of electrical or magnetic signals capable of being stored, transferred, combined, compared, and otherwise manipulated. It is sometimes convenient, principally for reasons of common usage, to refer to these signals as bits, values, variables, characters, data packets, or the like. It should be remembered, however, that all of these and similar terms are to be associated with the appropriate physical quantities and are merely convenient labels applied to these quantities.

Further, the manipulations performed are often referred to in terms, such as translating, running, selecting, specifying, determining, or comparing. In any of the operations described herein that form part of the present invention, these operations are machine operations. Useful machines for performing the operations of the present invention include general purpose and specially designed computers or other similar devices. In all cases, there should be borne in mind the distinction between the method of operations in operating a computer or other processing device and the method of computation itself. The present invention relates to method steps for operating a Local Director system in processing electrical or other physical signals to generate other desired physical signals.

The present invention also relates to an apparatus for performing these operations. This apparatus may be specially constructed for the required purposes, or it may be a general purpose programmable machine selectively activated or reconfigured by a computer program stored in memory. The processes presented herein are not inherently related to any particular computer or other apparatus. In particular, various general purpose machines may be used with programs written in accordance with the teachings herein, or it may be more convenient to construct a more specialized apparatus to perform the required method steps. The general structure for a variety of these machines will appear from the description given below.

Still further the present invention relates to machine readable media on which are stored program instructions for performing operations on a computer. Such media includes by way of example magnetic disks, magnetic tape, optically readable media such as CD ROM's, semiconductor memory such as PCMCIA cards, etc. In each case, the medium may take the form of a portable item such as a small disk, diskette, cassette, etc., or it may take the form of a relatively larger or immobile item such as a hard disk drive or RAM provided in a computer.

Figure 9:
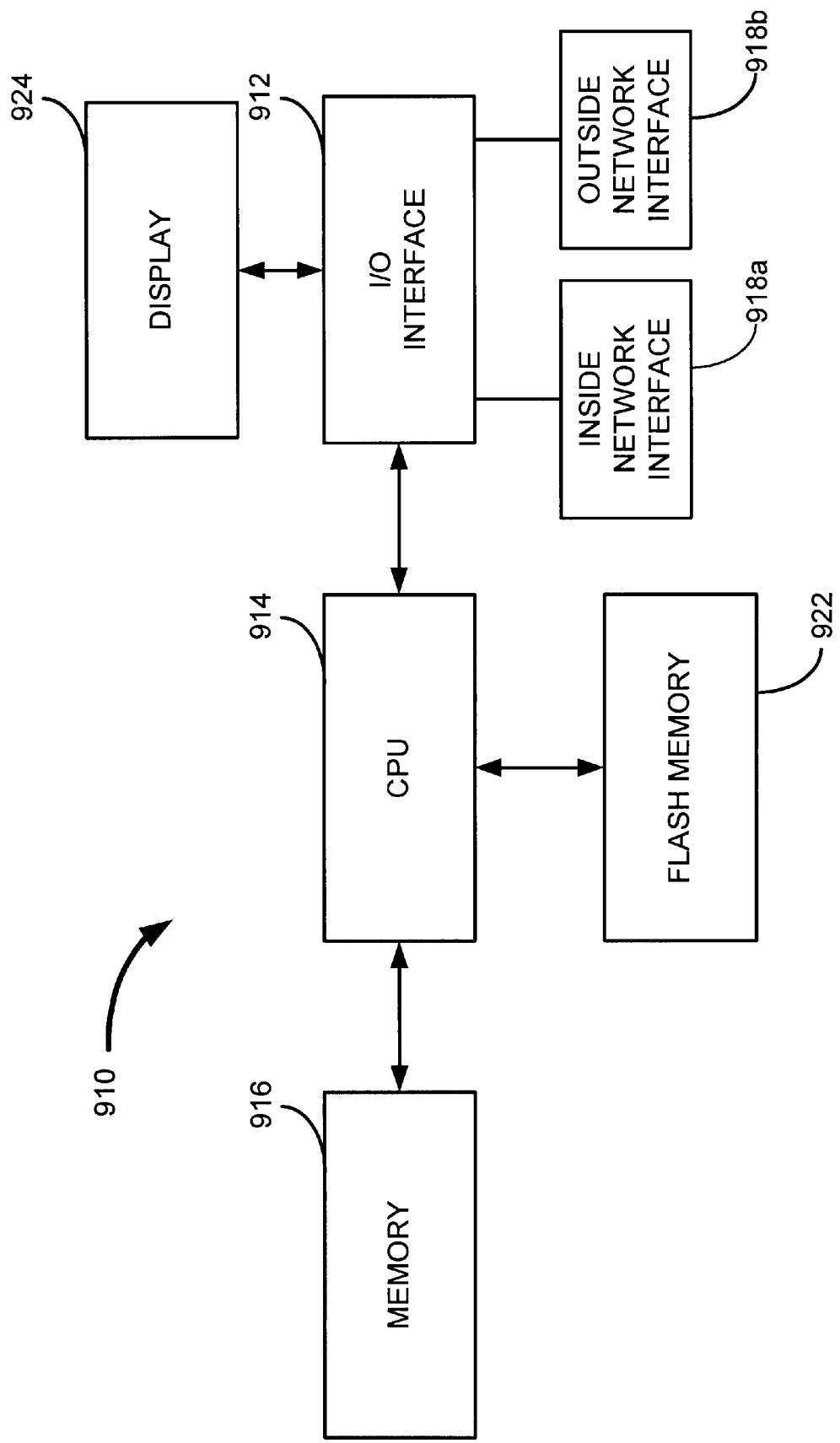
FIG. 9 illustrates a typical computer-based system which may be used as a Local Director of the present invention.

FIG. 9 illustrates a typical computer-based system which may be used as a Local Director of the present invention. Shown is a computer 910 which comprises an input/output interface 912 used to communicate information in appropriately structured form to and from the parts of computer 910 and associated equipment, a central processing unit 914, and a memory 916. These components are those typically found in most general and special purpose computers 910 and are intended to be representative of this broad category of data processors.

Connected to the input/output circuit 912 are inside and outside high speed Local Area Network interfaces 918a and 918b. The inside interface 918a is connected to a private network, while the outside interface 918b is be connected to an external network such as the Internet. Preferably, each of these interfaces includes (1) a plurality of ports appropriate for communication with the appropriate media, (2) associated logic, and in some instances (3) memory. The associated logic may control such communications intensive tasks as packet integrity checking and media control and management. The high speed interfaces 918a and 918b are preferably multiport Ethernet interfaces, but may be other appropriate interfaces such as FDDI interfaces, etc.

The computer system may also include an input device (not shown) such as a keyboard. A flash memory device 922 is coupled to the input/output circuit 912 and provides additional storage capability for the computer 910. The flash memory device 922 may be used to store programs, data and the like and may be replaced with a magnetic storage medium or some other well known device. It will be appreciated that the information retained within the flash memory device 922, may, in appropriate cases, be incorporated in standard fashion into computer 910 as part of the memory 916.

In addition, a display monitor 924 is illustrated which is used to display output messages or images generated by the present invention. Such a display monitor 924 may take the form of any of several well-known varieties of cathode ray tube displays and flat panel displays or some other type of display.

Although the system shown in FIG. 9 is a preferred computer system of the present invention, the displayed computer architecture is by no means the only architecture on which the present invention can be implemented. For example, other types of interfaces and media could also be used with the computer.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. An internet traffic simulator comprising:
   an application layer connection producer configured to produce a TCP connection by randomly determining an IP address and requesting a TCP layer process to make a TCP connection to the randomly determined IP address wherein the application layer connection producer thread process does not block or wait for the TCP connection to be established;
   an application layer TCP connection event consumer configured to retrieve information from the TCP connection, record statistics related to the information and end without blocking or waiting for another TCP connection event to occur.

2. A system of simulating a plurality of TCP connections directed toward an Internet site under test comprising:
   a processor configured to activate a producer thread process, the producer thread process including:
     randomly determining an IP address; and
     requesting a TCP layer process to make a TCP connection to the randomly determined IP address;
     wherein the producer thread process does not block or wait for the TCP connection to be established;
   the processor also configured to activate a consumer thread process upon the occurrence of an event on the TCP connection, the consumer thread process including:
     retrieving information from the TCP connection;
     recording statistics related to the information; and
     ending the consumer thread process; and
   a memory coupled with the processor to provide the processor with instructions.

3. A system of simulating a plurality of TCP connections directed toward an Internet site under test comprising:
   means for activating a producer thread process, the producer thread process including:
     randomly determining an IP address; and
     requesting a TCP layer process to make a TCP connection to the randomly determined IP address;
     wherein the producer thread process does not block or wait for the TCP connection to be established;
   means for activating a consumer thread process upon the occurrence of an event on the TCP connection, the consumer thread process including:

retrieving information from the TCP connection;
recording statistics related to the information; and
ending the consumer thread process.

4. A computer program product for simulating a plurality of TCP connections directed toward an Internet site under test, comprising:
computer code activating a producer thread process, the producer thread process including:
randomly determining an IP address; and
requesting a TCP layer process to make a TCP connection to the randomly determined IP address;
wherein the producer thread process does not block or wait for the TCP connection to be established;
computer code activating a consumer thread process upon the occurrence of an event on the TCP connection, the consumer thread process including:
retrieving information from the TCP connection;
recording statistics related to the information; and
ending the consumer thread process; and
a computer readable medium that stores the computer codes.

5. A method of simulating a plurality of TCP connections directed toward an Internet site under test comprising:
activating a producer thread process, the producer thread process including:
randomly determining an IP address; and
requesting a TCP layer process to make a TCP connection to the randomly determined IP address;
wherein the producer thread process does not block or wait for the TCP connection to be established;
activating a consumer thread process upon the occurrence of an event on the TCP connection, the consumer thread process including:
retrieving information from the TCP connection;
recording statistics related to the information; and
ending the consumer thread process.

6. A method of simulating a plurality of TCP connections as recited in claim 1 wherein the consumer thread process does not block or wait for another TCP connection event to occur.

7. A method of simulating a plurality of TCP connections as recited in claim 1 wherein recording statistics related to the information includes determining whether the information includes an http return code.

8. A method of simulating a plurality of TCP connections as recited in claim 1 wherein recording statistics related to the information includes recording a type of http return code that is received.

9. A method of simulating a plurality of TCP connections as recited in claim 1 wherein the consumer thread process further includes determining that the TCP connection has been closed and activating a second producer thread process to create a connection to replace the closed connection.

10. A method of simulating a plurality of TCP connections as recited in claim 1 wherein requesting a TCP layer process to make a TCP connection to the randomly determined IP address includes creating a TCB that is part of a select group.

11. A method of simulating a plurality of TCP connections as recited in claim 1 wherein activating a consumer thread process upon the occurrence of an event on the TCP connection includes detecting a connection event for a TCB that is part of a select group.

12. A method of simulating a plurality of TCP connections as recited in claim 1 wherein activating a consumer thread process upon the occurrence of an event on the TCP connection includes passing a connection ID pointer to the consumer thread process.

13. A method of simulating a plurality of TCP connections as recited in claim 12 wherein the connection ID pointer points to a connection ID object.

14. A method of simulating a plurality of TCP connections as recited in claim 13 wherein the connection ID object includes the simulated source IP address of the connection.

15. A method of simulating a plurality of TCP connections as recited in claim 13 wherein the connection ID object includes the simulated source port number of the connection.

16. A method of simulating a plurality of TCP connections as recited in claim 1 wherein the consumer thread process that is activated is the first process in a sleeping consumer thread queue.

17. A method of simulating a plurality of TCP connections as recited in claim 1 wherein a plurality of consumer thread processes are activated and wherein an active consumer thread queue determines the order of execution of the consumer thread processes.

18. A method of simulating a plurality of TCP connections as recited in claim 1 wherein the producer thread process is an application layer process.

19. A method of simulating a plurality of TCP connections as recited in claim 1 wherein randomly determining an IP address includes checking the randomly determined IP address against a table of excluded IP addresses.

20. A method of simulating a plurality of TCP connections as recited in claim 19 wherein the table of excluded IP addresses includes a subnet mask.

* * * * *

UNITED STATES PATENT AND TRADEMARK OFFICE
Certificate

Patent No. 6,295,557 B1                                              Patented: September 25, 2001

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Andrew L. Foss, San Jose, CA; Richard A. Howes, Roswell, GA; William M. Leblanc, Athens, GA; Edward C. Kersey, Athens, GA; and Peter A. Tenereillo, Carlsbad, CA.

Signed and Sealed this Second Day of September 2003.

*RUPAL DHARIA*
*Supervisory Patent Examiner*
Art Unit 2141